United States Patent
Kister et al.

(10) Patent No.: US 7,581,719 B2
(45) Date of Patent: Sep. 1, 2009

(54) CONFIGURATIONS AND METHODS FOR RIBBED DOWNCOMER WALL

(75) Inventors: Henry Kister, Corona Del Mar, CA (US); Walt Stupin, Whittier, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 704 days.

(21) Appl. No.: 10/533,068

(22) PCT Filed: Nov. 21, 2003

(86) PCT No.: PCT/US03/37958

§ 371 (c)(1),
(2), (4) Date: Mar. 27, 2006

(87) PCT Pub. No.: WO2004/047967

PCT Pub. Date: Jun. 10, 2004

(65) Prior Publication Data

US 2006/0197239 A1  Sep. 7, 2006

Related U.S. Application Data

(60) Provisional application No. 60/428,490, filed on Nov. 22, 2002.

(51) Int. Cl.
*B01F 3/04* (2006.01)
(52) U.S. Cl. .......................... 261/97; 261/110
(58) Field of Classification Search .................. 261/97, 261/98, 110, 111, 112.1, 112.2
See application file for complete search history.

(56) References Cited

U.S. PATENT DOCUMENTS

| | | | | |
|---|---|---|---|---|
| 3,743,256 A | * | 7/1973 | Oplatka | 261/98 |
| 4,385,010 A | * | 5/1983 | Bosne | 261/110 |
| 4,855,089 A | * | 8/1989 | Michels | 261/97 |
| 5,014,740 A | * | 5/1991 | Cameron | 137/561 A |
| 5,439,620 A | * | 8/1995 | Maeda | 261/97 |
| 6,293,526 B1 | * | 9/2001 | Fischer et al. | 261/97 |
| 6,395,139 B1 | * | 5/2002 | Potthoff | 202/262 |
| 6,575,437 B2 | * | 6/2003 | Fischer et al. | 261/97 |

* cited by examiner

*Primary Examiner*—Scott Bushey
(74) *Attorney, Agent, or Firm*—Fish & Associates, PC

(57) ABSTRACT

An inclined fluid receiving surface (230) is positioned a short distance away from a pipe distributor (210) having a plurality of openings (212) and receives from the openings a liquid-containing fluid (220) with a horizontal momentum (222) in the direction of the pipe flow. The fluid receiving surface (230) further includes a flow-impeding portion (232) that reduces the horizontal momentum (222) of the fluid (220) on the fluid receiving surface (230), thereby significantly improving distribution of the fluid (220).

16 Claims, 2 Drawing Sheets

CONFIGURATIONS AND METHODS FOR RIBBED DOWNCOMER WALL

This application claims priority to U.S. provisional application Ser. No. 60/428,490, which was filed Nov. 22, 2002, and which is incorporated by reference herein.

FIELD OF THE INVENTION

The field of the invention is fluid distribution, and particularly as it relates to fluid distribution in distillation and absorption towers.

BACKGROUND OF THE INVENTION

Feeds, pump-arounds, and refluxes to distillation, absorption, quench and wash towers are commonly introduced by pipe distributors. Most of the known pipe distributors include openings (e.g., slots or holes) to spread out the liquid containing-jets issuing from the openings. A typical example is depicted in U.S. Pat. No. 5,014,740 in which a plurality of jets are arranged along a distributor pipe at various angles to ensure wide distribution. Alternatively, a pipe distributor may also include openings that release a fluid against an impingement wall to spread out the fluid stream. An exemplary configuration is depicted in U.S. Pat. No. 4,855,089, in which the impingement wall may additionally include a corrugated portion for lateral distribution of the fluid.

Where the incoming fluid consists of both liquid and gas, jets are typically directed against a vertical or inclined wall, typically the wall of a downcomer or an impingement baffle, which is often placed a short distance away from the openings (wherein the openings usually point at an angle towards the wall). Thus, the wall spreads up the jets, and if the jets contain gas, the wall also separates the up-flowing gas from the down-flowing liquid.

In order to achieve even distribution of the introduced fluid, the velocity of the fluid exiting the holes or slots in the pipe distributors within the tower must generally be about 2-3 times greater than the fluid velocity in the pipe. This requires either using high hole (or slot) velocities or low pipe velocities. High hole velocities are often undesirable, as they tend to lead to excessive splashing, turbulence and entrainment. On the other hand, low pipe velocities are also often undesirable because they lead to expensive nozzle and internal piping requirements, which may interfere with other tower internals (e.g., trays).

Consequently, many known pipe distributor configurations are based on a compromise in which hole (or slot) velocity is substantially identical with pipe velocity. Unfortunately, such configurations typically exhibit significantly adverse distribution characteristics. Most significantly, the horizontal momentum in the direction of flow inside the pipe persists as the fluid exits the pipe, thus resulting in relatively high flows towards the end of the pipe and low flows near the beginning of the pipe. The relatively high liquid flow towards the end of the pipe leads to maldistribution in the unit (e.g., distillation tray beneath the pipe distributor) that receives the liquid.

Therefore, although there are numerous pipe distributor configurations and methods are known in the art, all or almost all of them suffer from one or more disadvantages. Consequently, there is still a need to provide improved configurations and methods for pipe distributors.

SUMMARY OF THE INVENTION

The present invention is directed to configurations and methods of improving fluid distribution in various vessels, and especially chemical process towers, in which one or more flow-impeding elements prevent or reduce maldistribution of a fluid on a fluid receiving surface.

In one aspect of the inventive subject matter, a vessel includes a pipe distributor that is at least partially enclosed by the vessel, wherein the pipe distributor further includes a plurality of openings. A vertical or inclined fluid receiving surface is positioned a short distance away from (and preferably below) the pipe distributor, wherein the fluid receiving surface receives a liquid-containing fluid that exits through the plurality of openings, wherein the liquid-containing fluid has a horizontal momentum in direction of pipe flow when the fluid impinges on the fluid receiving surface, and wherein the fluid receiving surface comprises a flow-impeding portion that reduces or even eliminates the horizontal momentum of the fluid on the fluid receiving surface.

In especially preferred aspects of the inventive subject matter, the fluid (e.g., a tower feed, a pump-around, or a reflux to the vessel) impinges on the fluid receiving surface at an angle of between 25 degrees to 60 degrees relative to a vertical axis of the vessel, and/or wherein the fluid receiving surface forms an angle of 0 degrees to 45 degrees relative to the vertical axis of the vessel. Thus, contemplated fluid receiving surfaces include impingement baffles, a downcomer, or false downcomer.

Particularly contemplated flow-impeding portions comprise a rib that is coupled to the fluid receiving surface substantially perpendicular to the horizontal momentum, an indentation in the fluid receiving surface substantially perpendicular to the horizontal momentum, and/or a plurality of ordered or randomly arranged protrusions (or indentations) from the fluid receiving surface.

Therefore, particularly contemplated methods of improving fluid distribution in a process vessel will include one step in which an inclined fluid receiving surface is positioned a short distance away from a pipe distributor, wherein the fluid receiving surface receives a liquid-containing fluid that exits through a plurality of openings in the pipe distributor, wherein the liquid-containing fluid has a horizontal momentum in direction of pipe flow when the fluid impinges on the fluid receiving surface. In another step, a flow-impeding portion is included in the fluid receiving surface such that the flow-impeding portion reduces or even eliminates the horizontal momentum of the fluid on the fluid receiving surface.

Various objects, features, aspects and advantages of the present invention will become more apparent from the following detailed description of preferred embodiments of the invention.

DETAILED DESCRIPTION

The inventors discovered that fluid distribution in a vessel, and especially in a distillation or absorption tower may be significantly improved by providing a structure that reduces or breaks a momentum of a liquid-containing fluid issuing from pipe distributors that otherwise would lead to maldistribution or other undesirable effects.

Consequently, the inventors contemplate a vessel that at least partially encloses a pipe distributor, wherein the pipe distributor has a plurality of openings, wherein a fluid exits through the plurality of openings, and wherein the fluid has a horizontal momentum when the fluid exits through the plurality of openings. In addition, an inclined or vertical fluid receiving surface receives at least part of the fluid with a horizontal momentum in the direction of the flow, wherein the fluid receiving surface includes a structure that reduces the horizontal momentum.

Figure 1:
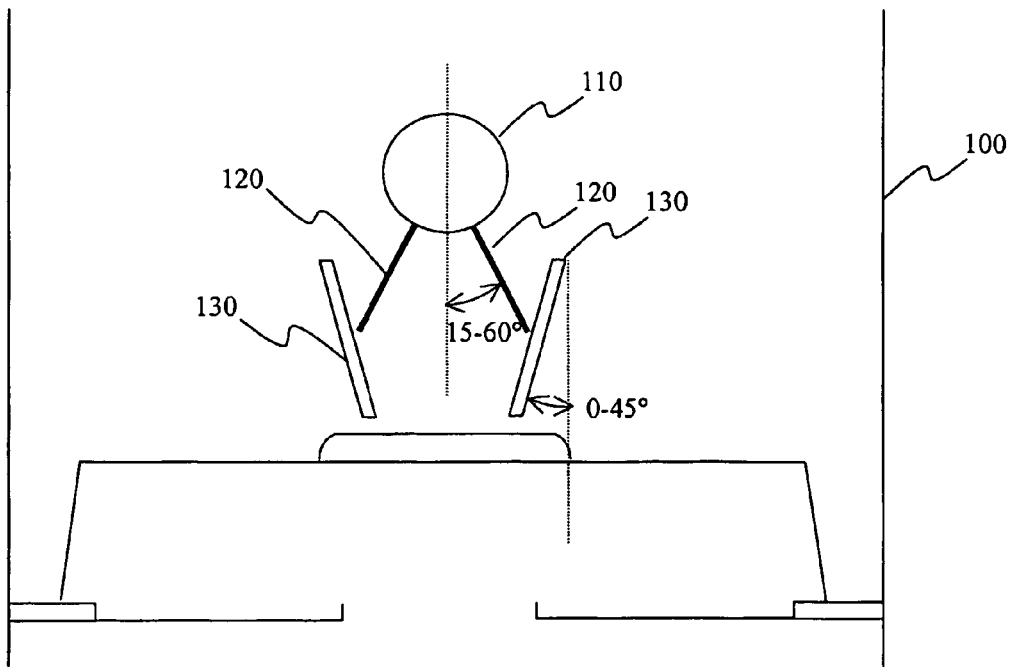
FIG. 1 is an exemplary schematic view of a pipe distributor configuration according to the inventive subject matter.
Figure 2:
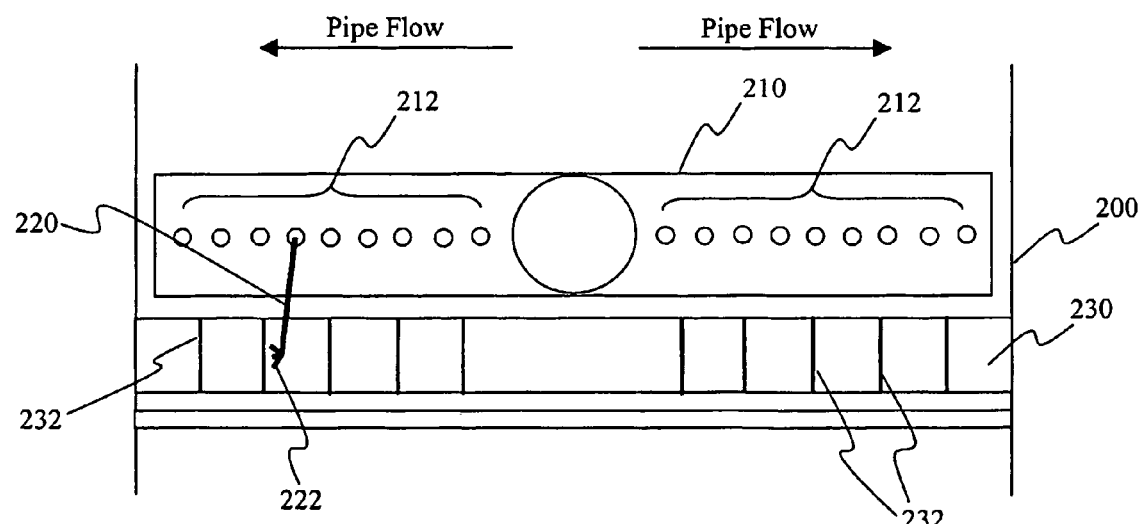
FIG. 2 depicts the pipe distributor configuration of FIG. 1 from a different perspective.

In a particularly preferred aspect of the inventive subject matter as depicted in FIG. 1, a vessel 100 has a pipe distributor with a distribution pipe 110 with a plurality of openings (not shown, see FIG. 2) that direct the flow of fluid 120 against the fluid receiving surfaces 130 of a false downcomer. Fluid receiving surfaces 130 are coupled to the vessel such that the surface that receives the fluid will form an angle with a vertical axis of the vessel of between about 0-45° degrees. The fluid receiving surface is typically proximally positioned to the pipe distributor (e.g., positioned entirely below the pipe distributor, or extending from below to above the pipe distributor, at a distance of typically between 10 cm to about 3 meters). Fluid streams 120 form an angle of about 25° to the vertical (dotted line), and have a relatively strong horizontal momentum (i.e., sufficient horizontal momentum to force the fluid towards the inside wall of the vessel). FIG. 2, which is a partial side view of the apparatus of FIG. 1, depicts vessel 200 with distribution pipe 210 with a plurality of openings 212 that direct the flow of the fluid 220 (horizontal flow of fluid 222) against the fluid receiving surfaces 230 of a false downcomer, which has a plurality of ribs 232 that reduce and/or breaks the horizontal momentum of the fluid in the direction of the flow.

It should generally be appreciated that in previously known configurations where a pipe discharges into a false downcomer, a liquid head should theoretically be built up by the downcomer and thereby equalize liquid maldistribution to at least some degree. However, in practice, equalization is often not achieved due to the horizontal momentum of the fluid coming out of the jets. Lack of equalization is particularly severe in low liquid loads. In such cases, the clearance under the false downcomer typically needs to be kept high to prevent plugging. As a result, there is little head in the false downcomer, which tends to impede correction of liquid maldistribution. Lack of equalization is even more severe where the pipe distributor discharges against the external wall of a downcomer or impingement baffle. In such cases, there is no redistribution device before the liquid enters the tray.

Moreover, it should be recognized that the liquid coming out of the distribution pipe has a horizontal momentum from the inlet end of the distributor pipe towards the vessel wall opposite the inlet. Consequently, liquid exiting the distribution holes hits the inside walls of a downcomer (where installed), deflects downwards along the wall, but retains the horizontal momentum directing it from the inlet end towards the vessel shell opposite the inlet. The net result of such known configurations is excessive liquid reaching the shell end of the downcomer and a relative lack of liquid in the portion of the downcomer near the inlet of the distributor pipe, which will be transmitted onto a downstream tray, eventually leading to efficiency loss and premature bottlenecks. Lack of equalization is particularly severe if the feed enters the distributor pipe at one wall of the vessel and flows across the vessel towards the opposite wall.

In contrast, configurations according to the inventive subject matter significantly reduce maldistribution of fluids from a pipe distributor by adding flow-impeding portions (e.g., ribs) on the wall of the downcomers. Such structures reduce or even eliminate horizontal momentum that pushes the liquid towards the vessel shell, and direct the liquid downwards instead. In one preferred aspect of the inventive subject matter, the flow-impeding portions are ribs that are equally spaced apart (e.g., 6") on the inside of the downcomer wall where the fluid hits the downcomer wall. The term "flow-impeding portion" as used herein refers to all structures that reduce, or eliminate the horizontal flow momentum of the fluid once the fluid has contacted the fluid receiving surface (e.g., impingement baffle, downcomer, or false downcomer).

Figure 3:
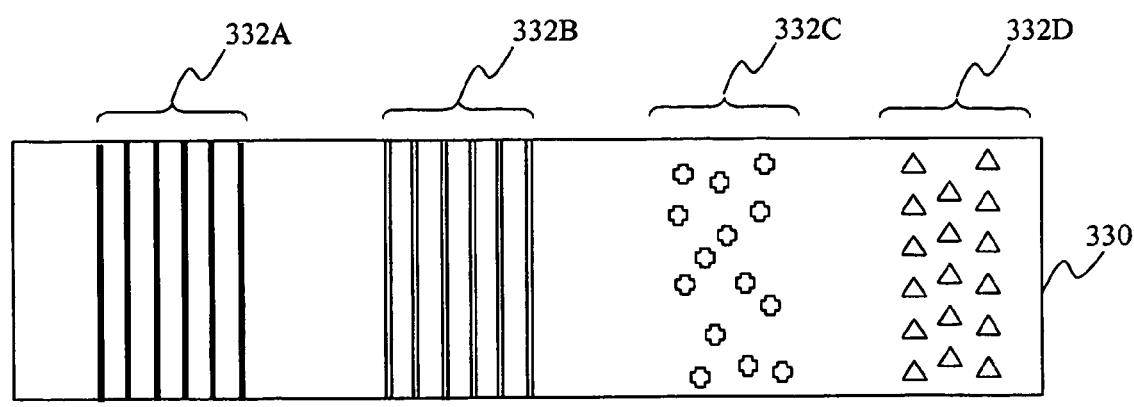
FIG. 3 depicts various exemplary flow-impeding portions on a fluid receiving surface.

With respect to the particular shape of suitable flow-impeding portions, it is generally contemplated that various shapes other than ribs (extending throughout the downcomer wall and having a width 1½") are also suitable, and alternative structures include wave-shaped ribs, zig-zag-shaped ribs, notched ribs, regularly or irregularly shaped elements, so long as such elements reduce the horizontal flow to at least some degree. Alternatively, the fluid receiving surface may also have one or more indentations (e.g., vertical or angled channels), or may be vertically corrugated. In still further contemplated alternative aspects, suitable flow-impeding portions may also include a plurality of ordered or randomly arranged protruding and/or recessed elements. An exemplary collection of suitable flow-impeding portions on a fluid receiving surface is depicted in FIG. 3, wherein the fluid receiving surface 330 has a first group of flow-impeding portions 332A, in which a plurality of protruding barriers (e.g., ⅟₁₆" width, 1" height) form a group of horizontal flow breakers. A second group of flow-impeding portions is shown as 332B, in which a plurality of parallel channels (e.g., 1" width, 1" depth) form a group of horizontal flow breakers. A third group of flow-impeding portions 332C has a plurality of randomly arranged protruding elements of random or cross shape (e.g., ½" diameter, ½" height) as a group of horizontal flow breakers. A fourth group of flow-impeding portions 332D has a plurality of ordered protruding elements of random or triangular shape (e.g., ½" width, ⅓" height) as a group of horizontal flow breakers.

Consequently, the number of suitable flow-impeding portions may vary considerably. For example, where the flow-impeding portion comprise ribs, between two and ten ribs (per downcomer wall) may be appropriate. On the other hand, where the flow-impeding portion comprises relatively small structures, ten to several hundred (and even more) are contemplated. Depending on the particular shape and arrangement of the flow-impeding portions, it should further be appreciated that the height/depth, width and distance from each other may vary considerably, so long as the flow-impeding portion(s) will at least reduce, if not even eliminate the horizontal momentum of the fluid. Still further, it is contemplated that the flow-impeding portion may be coupled to the downcomer wall in any manner (e.g., removable or permanently coupled) so long as the coupling retains the structures during operation. Alternatively, it is contemplated that the fluid receiving surface that receives the fluid may also be shaped in a manner such that the shape will reduce horizontal flow of a fluid impinging thereon (e.g., vertically corrugated, or corrugated at an angle).

Contemplated configurations are particularly suitable in relatively large (i.e., greater than 5-10 ft inner diameter) tray and other packed towers with pipe distributors discharging a fluid towards a vertical or inclined baffle (e.g., a downcomer wall) to improve feed and/or reflux distribution. It should further be recognized that in many cases, the improved distribution will have only a small (if any) impact on the operational parameter of the tower, However, and especially where a tower receives subcooled multicomponent feeds, improved distribution will reduce or even eliminate major bottlenecks and improve efficiency.

For adequate operation of a distillation or absorption column it is generally critical that the liquid distribution be even across the column cross section. This means that anytime a feed or reflux flow is introduced (and is a significant fraction of the liquid flow) in a previously known column, it is critical that the liquid be introduced evenly and in a fashion which does not significantly impact the distribution within the column. It should be especially recognized that with configurations according to the inventive subject matter presented herein, the flow rate may vary substantially. However, the present configurations are particularly effective for distribution of flows that include 50 gallons per minute or more of liquid. Contemplated fluids will preferably include hydrocarbons, aqueous, organic and inorganic feeds, pump-arounds, and/or reflux streams, wherein each of these feeds includes a liquid component and may also include a vapor component. The compositions of these flows will vary from nearly pure materials, in case of reflux streams for columns producing pure products, to complex mixtures of any number of different compounds in the case of the more typical reflux streams and feeds to columns for multi-component distillation and absorption.

With respect to suitable fluid receiving surfaces, it should be therefore appreciated that all known fluid receiving surfaces are deemed appropriate for use herein. Especially preferred fluid receiving surfaces include impingement baffles, downcomers, and false downcomers. It should further be appreciated that the particular distance between the pipe distributor and the fluid receiving surface may vary considerably, and that the proper distance will typically at least in part be determined by the flow rate, relative angle of the fluid jets, and/or fluid composition. Similarly, the angle of the fluid receiving surface may vary considerably. However, it is generally preferred that the angle of the fluid receiving surface (relative to a hypothetical vertical axis) is between zero and 45 degrees. Thus, the term "inclined fluid receiving surface" also includes a vertical fluid receiving surface.

Depending on the angle of the fluid receiving surface, the angle (relative to a hypothetical vertical axis) at which the fluid jet exits the pipe distributor may vary considerably. However, especially preferred jet angles include those between 15 and 60 degrees. Furthermore, it should be recognized that the angle will also at least in part be determined by the specific configuration of the pipe distributor. Suitable pipe distributors include all known pipe distributors, and especially those that have at least two pipes in which the direction of flow of the fluid is not identical. With respect to the openings in the pipe distributors, it is generally preferred that a plurality of round or rectangular openings are arranged in one or more rows to form one or more sets of fluid jets. However, numerous other known openings and arrangements are also contemplated (e.g., round, rectangular, square, oblong, or triangular openings disposed on the sides of the pipe distributors).

Consequently, the inventors contemplate a process vessel (and most preferably a distillation, absorption, quench or wash tower) that includes a pipe distributor that is at least partially enclosed by the vessel, wherein the pipe distributor includes a plurality of openings. Contemplated vessels further comprise an inclined fluid receiving surface positioned below the pipe distributor, wherein the fluid receiving surface receives a liquid-containing fluid that exits through the plurality of openings. Viewed from another perspective, a method of improving fluid distribution in a process vessel will therefore include one step in which an inclined fluid receiving surface is positioned a short distance away from a pipe distributor, wherein the fluid receiving surface receives a liquid-containing fluid that exits through a plurality of openings in the pipe distributor, and wherein the liquid-containing fluid has a horizontal momentum in the direction of pipe flow when the fluid impinges on the fluid receiving surface. In another step, a flow-impeding portion is included in the fluid receiving surface such that the flow-impeding portion reduces the horizontal momentum of the fluid on the fluid receiving surface. With respect to the vessel, the fluid receiving surface, the pipe distributor, the fluid, the flow-impeding portion, and other elements for such methods, the same considerations as provided above apply.

Thus, specific embodiments and applications of configurations for improved fluid distribution have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A vessel comprising:
   a pipe distributor at least partially enclosed by the vessel, and wherein the pipe distributor includes a plurality of openings;
   an inclined fluid receiving surface positioned proximal to the pipe distributor, wherein the fluid receiving surface receives a liquid-containing fluid that exits through the plurality of openings;
   wherein the liquid-containing fluid has a horizontal momentum in direction of pipe flow when the fluid impinges on the fluid receiving surface; and
   wherein the fluid receiving surface comprises a flow-impeding portion that reduces the horizontal momentum of the fluid on the fluid receiving surface.

2. The vessel of claim 1 wherein the fluid impinges on the fluid receiving surface at an angle of 15 degrees to 60 degrees relative to a vertical axis of the vessel.

3. The vessel of claim 2 wherein the fluid receiving surface forms an angle of 0 degrees to 45 degrees relative to the vertical axis of the vessel.

4. The vessel of claim 3 wherein the fluid receiving surface comprises an impingement baffle.

5. The vessel of claim 3 wherein the fluid receiving surface comprises a wall of a downcomer or false downcomer.

6. The vessel of claim 3 wherein the fluid is a feed, a pump-around, or a reflux to the vessel.

7. The vessel of claim 3 wherein the flow-impeding portion comprises a rib that is coupled to the fluid receiving surface substantially perpendicular to the horizontal momentum.

8. The vessel of claim 3 wherein the flow-impeding portion comprises an indentation in the fluid receiving surface substantially perpendicular to the horizontal momentum.

9. The vessel of claim 3 wherein the flow-impeding portion comprises a plurality of ordered or randomly arranged protrusions from the fluid receiving surface.

10. The vessel of claim 1 wherein the vessel is a distillation, absorption, quench, or wash vessel.

11. A method of improving fluid distribution in a vessel comprising:
   positioning an inclined fluid receiving surface below a pipe distributor, wherein the fluid receiving surface receives a liquid-containing fluid that exits through a plurality of openings in the pipe distributor;
   wherein the liquid-containing fluid has a horizontal momentum in direction of pipe flow when the fluid impinges on the fluid receiving surface; and
   including a flow-impeding portion in the fluid receiving surface such that the flow-impeding portion reduces the horizontal momentum of the fluid on the fluid receiving surface.

12. The method of claim 11 wherein the fluid impinges on the fluid receiving surface at an angle of 15 degrees to 60 degrees relative to a vertical axis of the vessel.

13. The method of claim 12 wherein the fluid receiving surface forms an angle of 0 degrees to 45 degrees relative to the vertical axis of the vessel.

14. The method of claim 13 wherein the flow-impeding portion comprises a rib that is coupled to the fluid receiving surface substantially perpendicular to the horizontal momentum.

15. The method of claim 13 wherein the flow-impeding portion comprises an indentation in the fluid receiving surface substantially perpendicular to the horizontal momentum.

16. The method of claim 13 wherein the flow-impeding portion comprises a plurality of ordered or randomly arranged protrusions from the fluid receiving surface.

* * * * *